United States Patent
Bothra

(10) Patent No.: US 7,614,024 B2
(45) Date of Patent: Nov. 3, 2009

(54) METHOD TO IMPLEMENT METAL FILL DURING INTEGRATED CIRCUIT DESIGN AND LAYOUT

(75) Inventor: Subhas Bothra, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 410 days.

(21) Appl. No.: 11/244,514

(22) Filed: Oct. 6, 2005

(65) Prior Publication Data

US 2007/0083833 A1 Apr. 12, 2007

(51) Int. Cl.
*G06F 17/50* (2006.01)

(52) U.S. Cl. .............. 716/10; 716/4; 716/5; 716/6; 716/8; 716/9; 716/11

(58) Field of Classification Search .......... 716/4–6, 716/8–11
See application file for complete search history.

(56) References Cited

U.S. PATENT DOCUMENTS

| | | | | |
|---|---|---|---|---|
| 4,615,011 A * | 9/1986 | Linsker | .............. | 716/13 |
| 5,225,771 A * | 7/1993 | Leedy | .............. | 324/757 |
| 5,742,099 A * | 4/1998 | Debnath et al. | .............. | 257/758 |
| 5,801,432 A * | 9/1998 | Rostoker et al. | .............. | 257/666 |
| 6,202,191 B1 * | 3/2001 | Filippi et al. | .............. | 716/5 |
| 6,226,782 B1 * | 5/2001 | Nowak et al. | .............. | 716/19 |
| 6,242,767 B1 * | 6/2001 | How et al. | .............. | 257/202 |
| 6,305,000 B1 * | 10/2001 | Phan et al. | .............. | 716/5 |
| 6,510,545 B1 * | 1/2003 | Yee et al. | .............. | 716/12 |
| 6,528,883 B1 * | 3/2003 | Dunham et al. | .............. | 257/758 |
| 6,532,581 B1 * | 3/2003 | Toyonaga et al. | .............. | 716/11 |
| 6,536,028 B1 * | 3/2003 | Katsioulas et al. | .............. | 716/17 |
| 6,711,727 B1 * | 3/2004 | Teig et al. | .............. | 716/12 |
| 6,748,579 B2 * | 6/2004 | Dillon et al. | .............. | 716/19 |
| 6,847,853 B1 * | 1/2005 | Vinciarelli et al. | .............. | 700/97 |
| 7,089,522 B2 * | 8/2006 | Tan et al. | .............. | 716/11 |
| 7,102,237 B1 * | 9/2006 | Dellinger | .............. | 257/773 |
| 7,146,593 B2 * | 12/2006 | Travis et al. | .............. | 716/10 |
| 7,222,322 B1 * | 5/2007 | Chyan et al. | .............. | 716/12 |
| 7,240,314 B1 * | 7/2007 | Leung | .............. | 716/8 |
| 7,328,419 B2 * | 2/2008 | Vuong et al. | .............. | 716/11 |
| 2002/0078425 A1 * | 6/2002 | Mehrotra et al. | .............. | 716/6 |
| 2005/0044517 A1 * | 2/2005 | Seaman et al. | .............. | 716/8 |
| 2006/0081988 A1 * | 4/2006 | Dunham et al. | .............. | 257/752 |
| 2006/0265684 A1 * | 11/2006 | Buehler et al. | .............. | 716/12 |

* cited by examiner

*Primary Examiner*—Naum B Levin
(74) *Attorney, Agent, or Firm*—Garlick Harrison & Markison; Holly L. Rudnick

(57) ABSTRACT

Embodiments of the present invention provide a system and method with which to implement metal fill during design using tools such as a place and route tools or layout tools. Unlike prior known solutions where metal fill was performed after design and layout, performing metal fill during layout with a uniform pattern of conductive traces sized and spaced according to the design rules of the device to be fabricated resulting in more planning and design. Dividing the conductive traces into active and inactive segments during the design and layout identifies potentially negative impacts on critical or sensitive device elements within the device during design and layout. Previously, metal fill was implemented after design and layout and often resulted in negative impacts not previously accounted for during IC design. Embodiments of the present invention reduce degradation, seen in other devices where metal fill is incorporated after design and layout. Additionally, because the physical characteristics of inactive metal fill segments are considered during design and layout of the ICs.

17 Claims, 7 Drawing Sheets

METHOD TO IMPLEMENT METAL FILL DURING INTEGRATED CIRCUIT DESIGN AND LAYOUT

TECHNICAL FIELD OF THE INVENTION

The present invention relates generally to integrated circuit design. More particularly the present invention relates to the incorporation and consideration of metal fill during IC layout and design.

BACKGROUND OF THE INVENTION

Integrated circuits (IC) are increasing in complexity. The number of devices incorporated within a single IC is greatly increasing and causing the size and complexity of individual ICs to increase. As a result of increased component density and improved fabrication technology is the realization of system on chip (SoC) applications. Such a system on a chip is illustrated in FIG. 1. Core 12 may include many logic and memory functions within it. For example, core 12 may include a CPU core, DSP core, DSP book, memory, control circuitry, and analog/mixed signal circuitry. These are just examples of the types of systems or components that may be integrated into a signal chip 10.

Complexities are associated with the realization of SoC designs. Incorporating diverse components previously contained within a single printed circuit board (PCB) involves confronting many design challenges. The components may be designed for different entities using different tools. Other difficulties lie in fabrication. In general, fabrication processes of memory may differ significantly from those associated with logic circuits. For example, speed may be the priority associated with a logic circuit while current leakage of the stored charge is of priority for memory circuits. Therefore, multi-level interconnect schemes using five to six levels of metal are essential for logic ICs in order to offer improved speed, while memory circuits may need only two to three levels.

Non-planarity or non-planar topology can negatively impact the fabrication of integrated circuits. As devices within integrated circuits decrease in dimension and increase in concentration to property connect these circuits. More complex circuit paths are required. Given the complexity and the number of connections required for this increased number of devices, multiple additional metal level layers are required. Additional metal level layers also require additional insulating layers deposited in between the metal layers. For example, certain current integrated circuit (IC) chips may have up to six (6) levels of metal. Older, larger geometry ICs typically only required a single metal level. These additional layers negatively impact global and local planarity within the IC during fabrication because of the cumulative effect of non-planarity.

Non-planarity may affect etching, deposition, and photo printing processes during IC fabrication. Non-planar topology of multilevel wiring structures can have depth variations of plus or minus 0.5 microns for each metal layers and is cumulative over the entire stack. This depth disparity may reach 1.5 microns or more in a non-planarized structure. At some level of non-planarity etching, deposition, and photo processes result in unacceptably low yields. Photo printing processes are impacted by the non-planar topology as the depth of focus (DOF) will cause imaged patterns to be printed with different dimensions based on the DOF variations caused by the underlying non-planar topology.

One solution to the non-planar problem has been to add additional processing steps that planarize non-planar layers. These processes provide a more planar topology. One such process is chemical mechanical polishing (CMP). CMP is widely during the planarization of dielectric layers used in the fabrication of ICs. Global planarization establishes reliable multilevel metal interconnects and concurrently only be achieved using planarizing processes such as CMP. In CMP, material is removed from the surface of the wafer by a combination of chemical dissolution and abrasion. One of the common problems encountered during CMP arise from a non-uniformity regarding the rate of removing materials. For example, copper may be removed at a higher rate than that of a dielectric or glass. Thus, variations within the concentration of metal patterns may adversely affect global and local planarity.

Glass and metal may respond differently to planarizing processes such as the CMP process, wherein metal, such as copper, may be softer than glass. This may result in the metals being removed at a faster rate than glass. Such removal may result in cupping where the concentration of metal exceeds that of glass. Cupping may adversely affect the planarity of the integrated circuit (IC) and in so doing negatively impact other processes associated with the fabrication of the integrated circuit.

Additionally, large areas within an individual metal layer are often unused. These areas often referred to as "white areas," are sometimes used for metal fill. Metal filled patterning involves filling large open areas within each metal layer with a metal pattern. These areas may also be used to reroute circuit pathways when blockages in the original pathways occur without the need to completely redraw all metal patterns associated with the IC.

SUMMARY OF THE INVENTION

Embodiments of the present invention are directed to systems and methods that are further described in the following description and claims. Advantages and features of embodiments of the present invention may become apparent from the description, accompanying drawings and claims.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

Embodiments of the present invention provide an IC wherein individual metal layers include a plurality of conductive traces that substantially addresses the above-identified needs. These conductive traces, or metal lines, may be spaced according to a set of design rules associated with the fabrication of that IC. Design rule complying cuts may be made in the conductive traces to divide the conductive traces into active and inactive segments. The active conductive trace segments may then be used to form electrical circuits with connections to devices in other layers.

Embodiments of the present invention may reduce the variation associated with CMP or other planarizing processes by maintaining a relatively uniform metal percentage and pattern within the metal layer. This reduces or prevents dishing or cupping caused by localized areas where the metal concentration differs significantly from that within other parts of the metal layer. Additionally, incorporating both active and inactive segments of the conductive layers in the design process allows circuit designers and their layout tools to properly consider the physical effects of the inactive segments on IC design.

Figure 1:
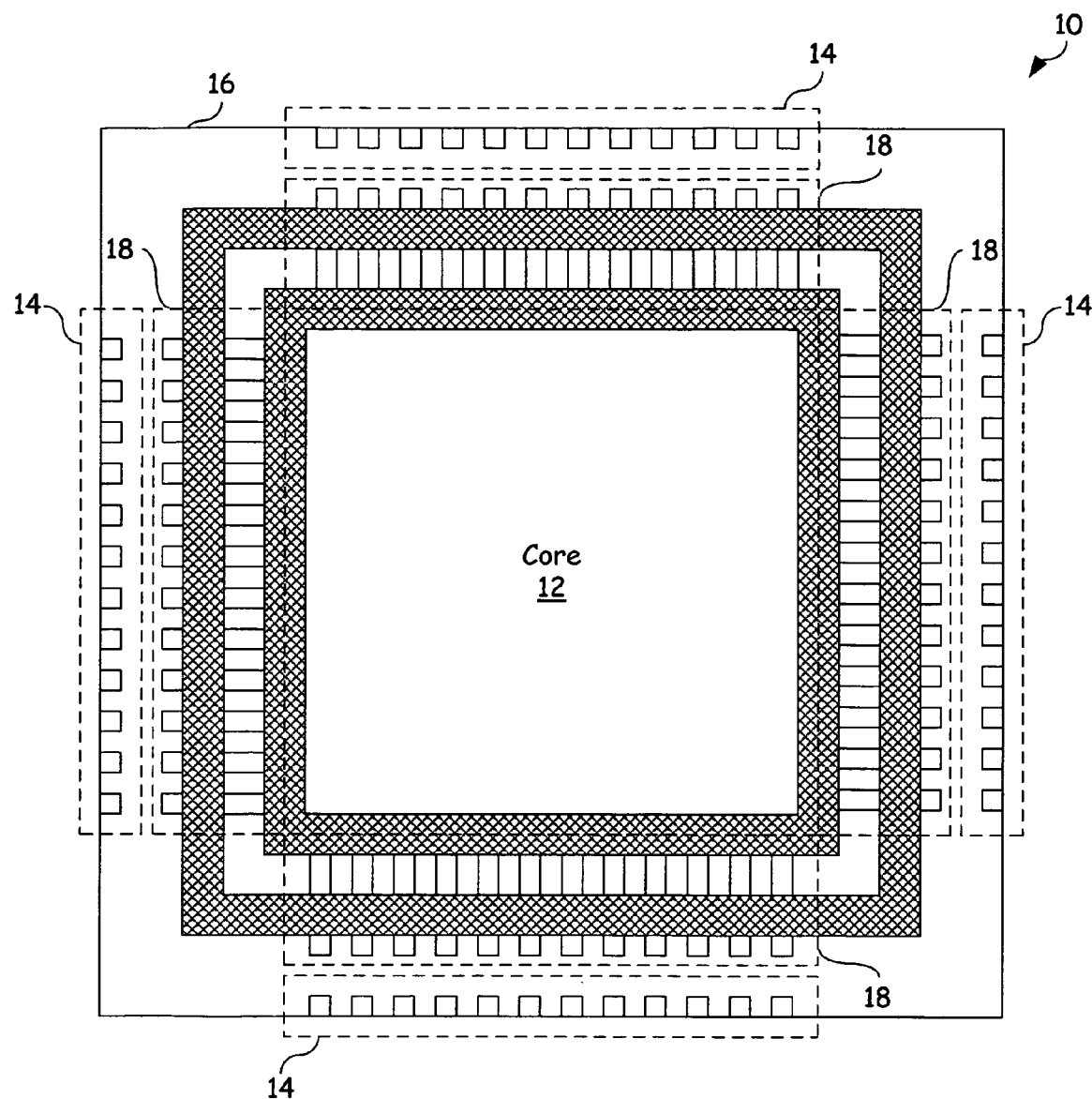
FIG. 1 provides a block diagram describing the architecture of a system on a chip integrated circuit.
Figure 2:
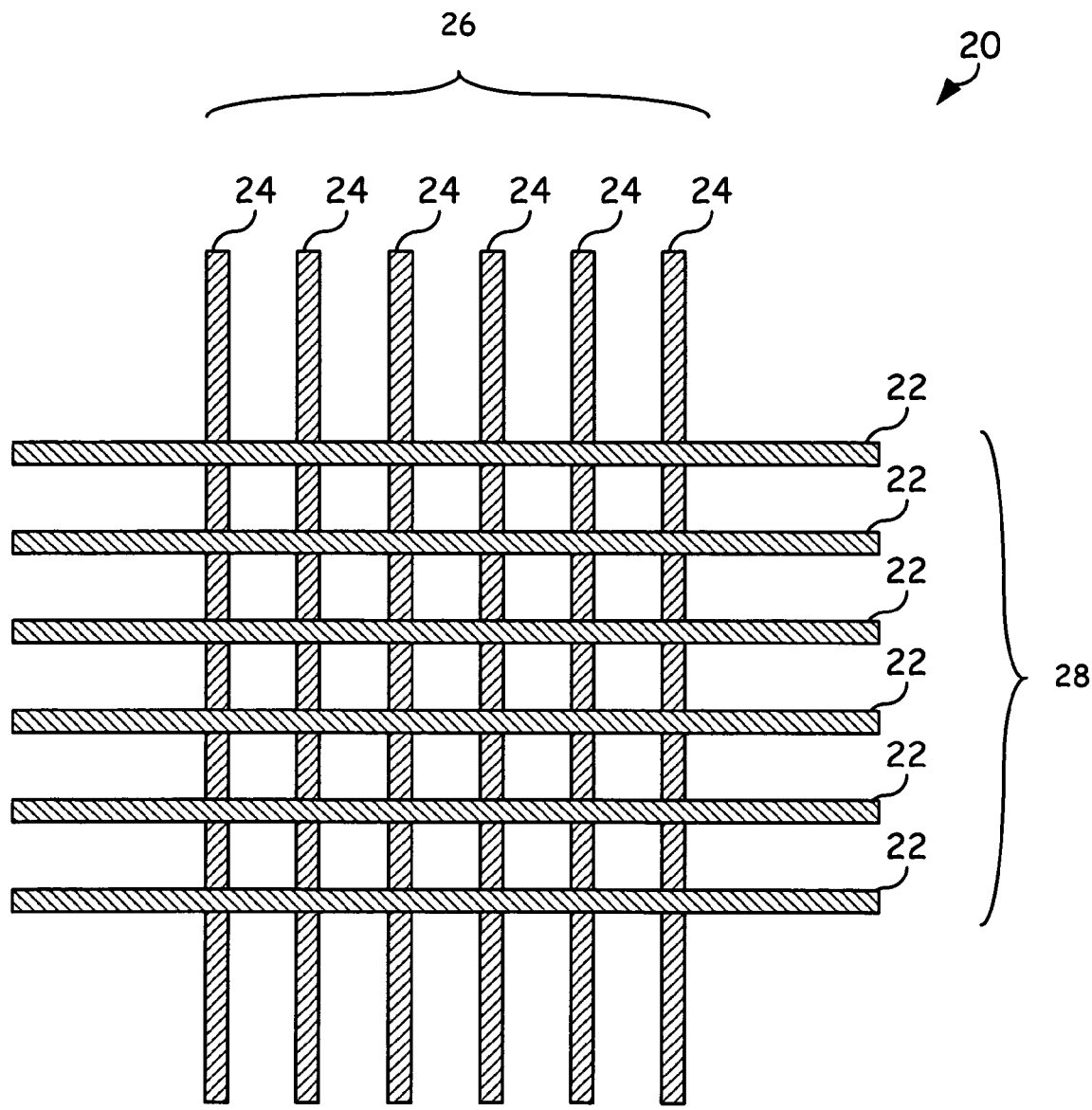
FIG. 2 shows two metal layers having orthogonal routing laid out as part of the layout process in accordance with an embodiment of the present invention.
Figure 3:
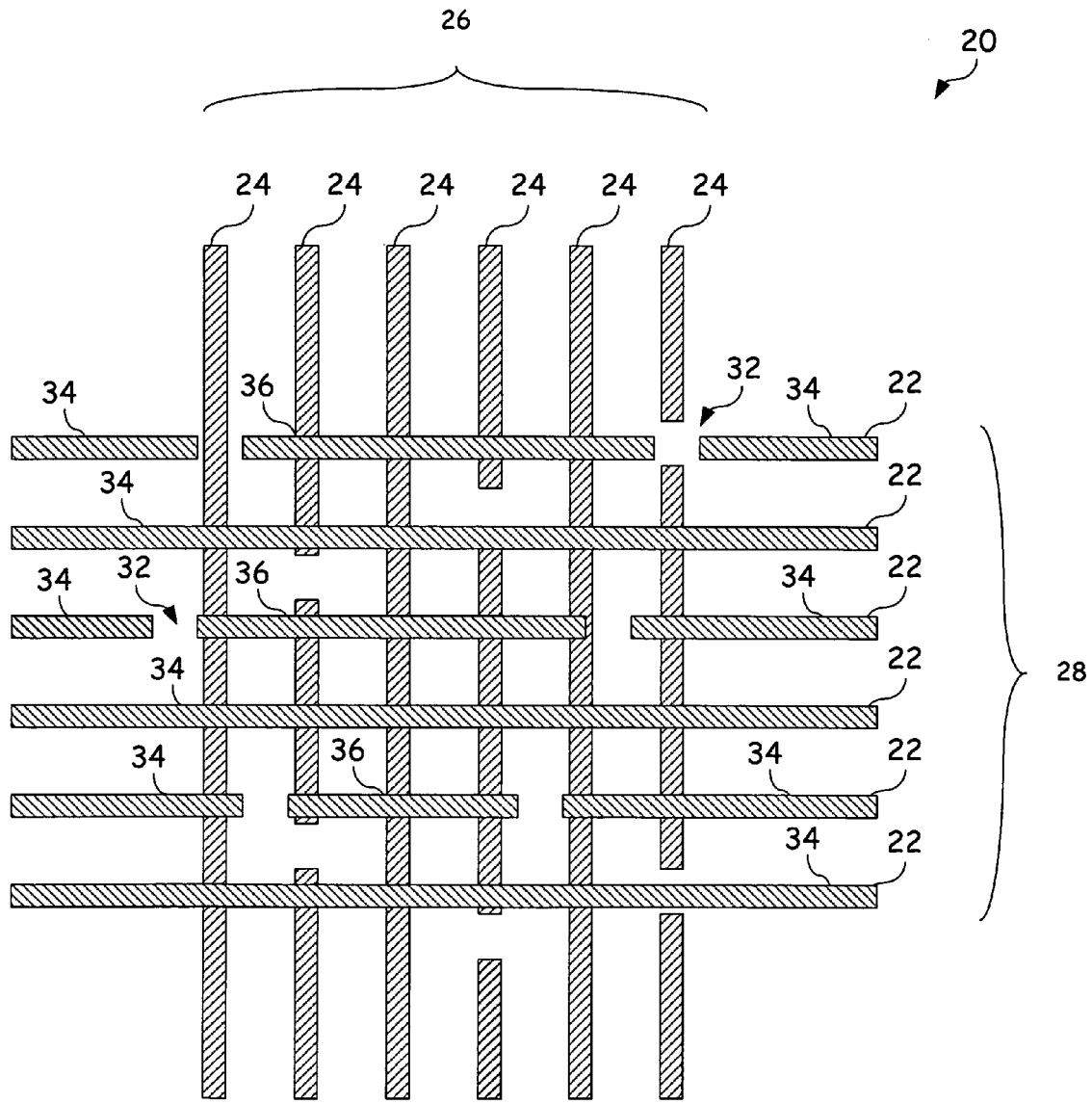
FIG. 3 shows two metal layers wherein the conductive traces are divided into active and inactive segments in accordance with an embodiment of the present invention.

FIG. 2 depicts two metal layers within an integrated circuit 20 with orthogonal routing. Here, conductive traces 22 and 24 are laid out in metal layers 28 and 26, respectively. These layers may be placed using damascene processes or other light processes associated with the manufacture of integrated circuits. In FIG. 3, the conductive traces of FIG. 2 are divided by design rule complaint spaces 32. It should be noted that the size and spacing of conductive traces 22 and 24 may be determined by the design rules associated with the fabrication of IC 20.

FIG. 3 illustrates how traces 22 and 24 may be divided into active and inactive segments by design rule compliant cuts or spaces 32. Active segments 36 and inactive segments 34 are both considered during the layout and verification phase of the design of IC 20. The impact of spaces 32 is minimal on the metal content of the layer 26 or 28. The active and inactive segments are specifically identified with respect to layer 28 but are not identified with respect to layer 26. Active segments 36 may be connected to other circuit elements within the IC through vias.

Conductor traces 22 and 24 of orthogonal layers 26 and 28 may be divided by design rule compliant cuts 32 in the traces. This ensures that the dimensions of these cuts are determined by the spacing requirements imposed by the design rules associated with the fabrication of the IC.

Figure 4:
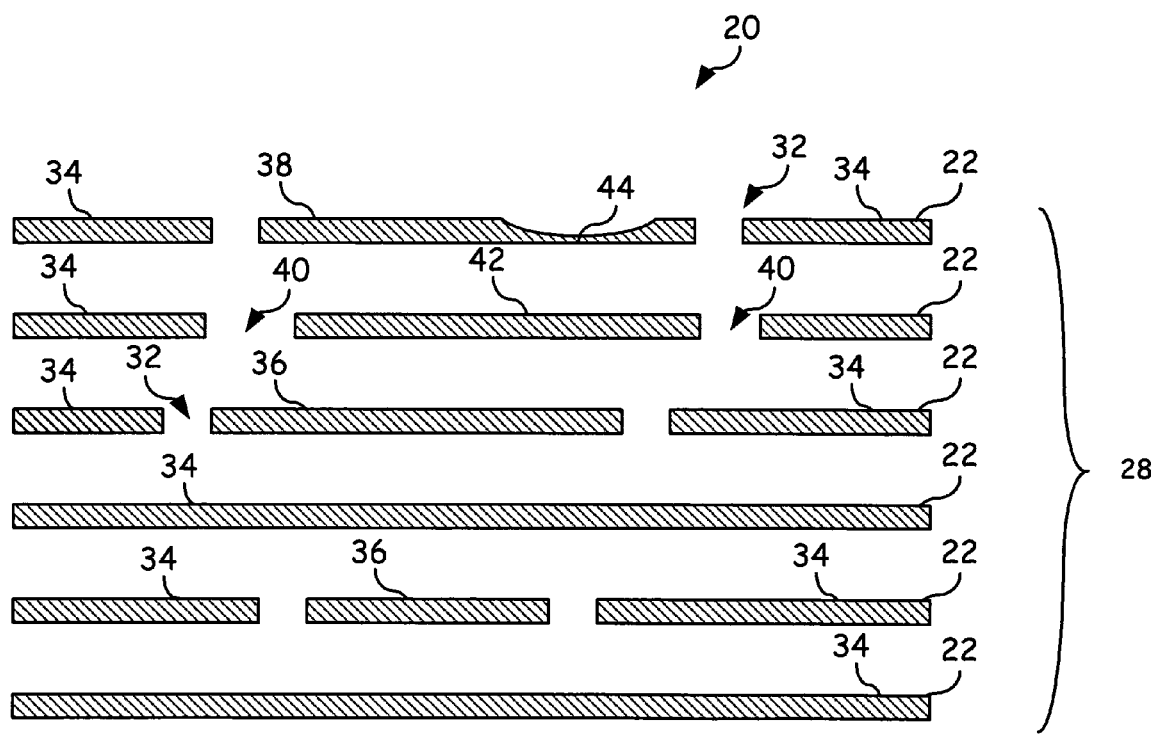
FIG. 4 shows the conductive traces associated with one metal layer wherein an active segment is replaced with a previously inactive segment in accordance with an embodiment of the present invention.

FIG. 4 depicts metal layer 28 wherein active segment 38 contains a blockage or discontinuity 44. Embodiments of the present invention allow the electrical circuit previously routed through active segment 38 to be routed through a previously inactive conductive trace. Here, conductive trace 22 is divided into inactive segments and active segment 42 by design rule compliance spaces 40. Segment 38 may be electrically isolated by removing vias in dielectric layers wherein the vias connect segment 38 to other electrical components within the IC. Alternatively, additional desirable compliant spaces may be inserted in active segment 38 to open circuit segment 38. The addition of design rule compliant spaces 40 should not greatly impact the overall metal percentage within layer 28. Thus, during the planarization process, such as CMP, process variation is minimized by changes in metal content. Previous solutions may have used white areas to place new metal patterns in order to provide an alternate circuit path to active segment 38. However, the additional metal pattern may typically result in metal percentages that exceed a desired range causing planarity issues. As the metal content increase the potential for dishing or cupping increases as well. Additionally, this alternative of creating an alternate circuit path in a prior white space is not necessarily considered during design and layout. Thus, the additional metal, in addition to potentially negatively impacting the fabrication process, and the physical characteristics thereof, may potentially negatively impact the circuit design, as this metal was not considered during verification. As segment 42 was previously an inactive segment the affects of the presence of this conductive trace may have largely been considered during the verification process. Thus, the impact of newly active segment 42 and design rule compliance spaces 40 may be minimal when compared to the placement of new metal patterns in white spaces. Additionally, new metal patterns in white spaces were not always able to be drawn in a design rule compliant matter. Since conductive traces 22 have been sized and spaced according to the design rules, the insertion of design rule compliant spaces 40 still ensures that newly active segment 42 is desirable compliant. Thus, the design rule compliant traces 22, active segments 36, inactive segments 34, deactivated segments 38 and newly activated segments 42 are considered during design and meet both design and process requirements.

Figure 5:
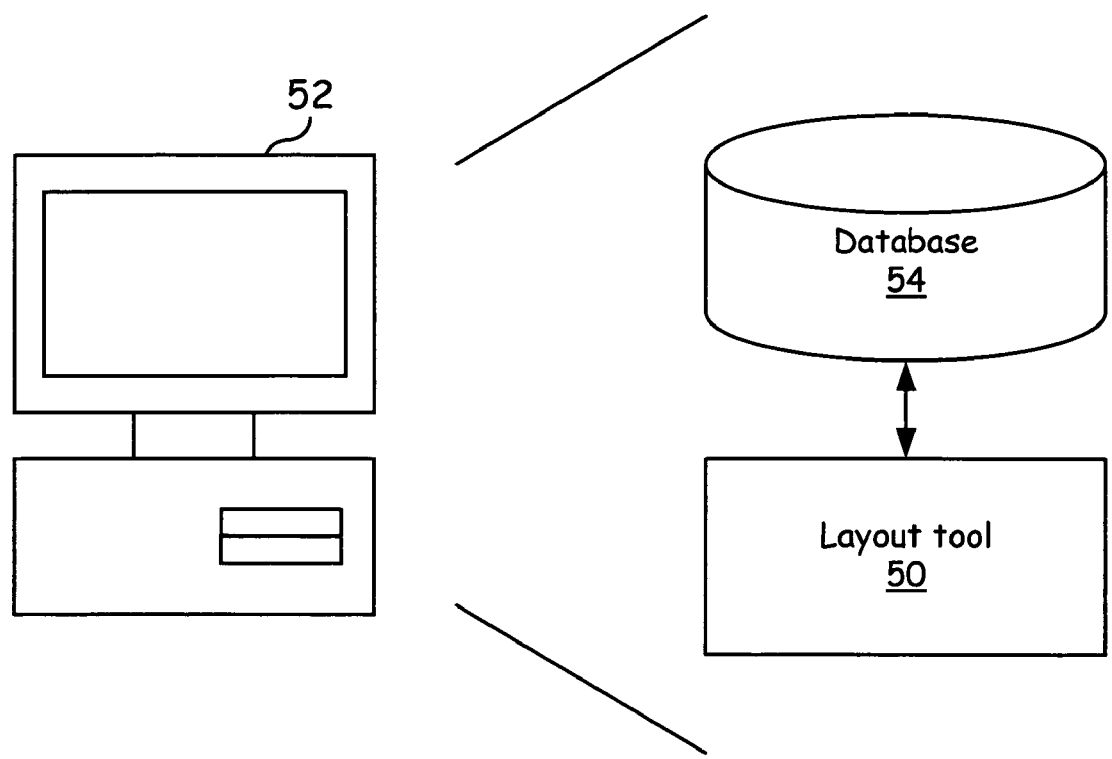
FIG. 5 describes a layout tool operable to be implemented within a computer system in accordance with an embodiment of the present invention.

To affect the layout of conductive traces such as those discussed with respect to reference FIGS. 2-4, IC designers often use layout tools to ensure the compliance with and automate the layout of the various IC layers in accordance with the design rules associates with fabrication of a particular IC. FIG. 5 depicts a layout tool 50 that may be implemented with a computer or processing system 52. Processing systems 52 can be any suitable computer-processing device that includes memory for storing and executing logic instructions, and is capable of interfacing with other processing systems. In some embodiments, processing systems 52 can also communicate with other external components via an attached network. Various input/output devices, such as keyboard and mouse (not shown), can be included to allow a user to interact with components internal and external to processing systems 53. Additionally, processing systems 52 can be embodied in any suitable computing device, and so include personal data assistants (PDAs), telephones with display areas, network appliances, desktops, laptops, X-window terminals, or other such computing devices. Logic instructions executed by processing systems 52 can be stored on a computer readable medium, or accessed by/transmitted to processing systems 52 in the form of electronic signals. Processing systems 52 can be configured to interface with each other, and to connect to external a network via suitable communication links such as any one or combination of T1, ISDN, or cable line, a wireless connection through a cellular or satellite network, or a local data transport system such as Ethernet or token ring over a local area network. The logic modules, processing systems, and circuitry described herein may be implemented using any suitable combination of hardware, software, and/or firmware, such as Field Programmable Gate Arrays (FPGAs), Application Specific Integrated Circuit (ASICs), or other suitable devices. The logic modules can be independently implemented or included in one of the other system components. Similarly, other components have been discussed as separate and discrete components. These components may, however, be combined to form larger, smaller, or different software modules, integrated circuits, or electrical assemblies, if desired.

Layout tools are software suites or packages that may include layout, verification, places out, schematic capture, and industry standard database conversion and support tools. Layout tools 50 facilitate the intricate layout design of integrated circuits through the use of attached data buses 54. Layout tools in accordance with an embodiment of the present invention further facilitate IC design by defining each conductive layer as a plurality of conductive traces spaced according to a set of design rules. Such an initial pattern is illustrated in FIG. 2. From these conductive traces, active segments may be formed with design rule compliant cuts as discussed with reference to FIG. 3. These cuts divide active segments which couple to other layers within the IC to form electrical circuits from inactive segments. The presence of inactive segments, which may be located in areas previously thought of as "white spaces," ensures a more uniform distribution of metal throughout the metal layer. These inactive segments may reduce process variation during fabrication of the IC and allow for increased planarity. Additionally, the layout tool may verify the IC design and performs design rule checks (DRC) to ensure that the active and inactive segments do not cause DRC violations during IC design. Since metal fill may typically performed after the identification of "white spaces," the affect of the metal fill was not always verified during IC design processes. Unlike the previously known layout tools, embodiments of the present invention place conductive traces according to the design rules during initial layout such that the electrical characteristics of both active segments and inactive segments are considered while performing verification checks on the operation of the IC.

Additionally, the presence of inactive segments offers significant advantages in that problems identified in verification or after initial tape out may be corrected by altering individual layers within the IC and not the entire mask set. For example, should a blockage to an existing circuit require an alternate circuit path, the previously used circuit path may be isolated with design rule compliant cuts. Then the circuit may be routed to previously inactive segments which couple to the electrical circuit with vias to other layers. This reduces or eliminates problems that arose with prior metal fill solutions that resulted in an unbalanced metal distribution within the alternative circuit pathways that may result in unacceptable process variations during IC fabrication. The alternate circuit path provided by the present invention will have a minimal effect on metal fill density. Thus, metal fill density throughout the layer remains within a desired range despite individual changes to the IC.

Figure 6:
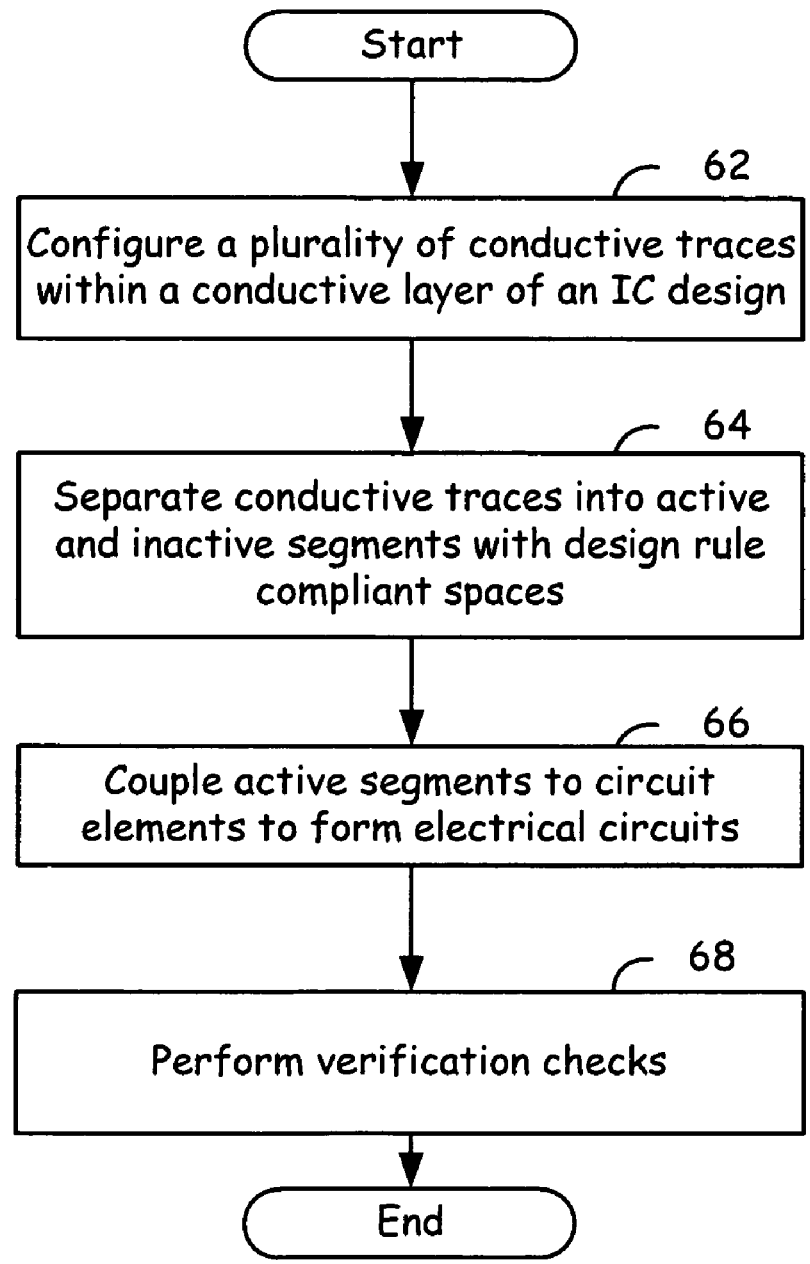
FIG. 6 provides a logic flow diagram illustrating the processes associated with layout and verification associated with the design of an integrated circuit in accordance with an embodiment of the present invention.

FIG. 6 provides a logic flow diagram in accordance with an embodiment of the present invention. The methodology presented here may be implemented using aids such as layout tools, route and place tools or other like tools that facilitate the design and fabrication of ICs. This method involves configuring conductive layers of an IC as a number of conductive traces distributed in accordance with design rules such that a desired metal fill density is achieved locally and globally in step 62. The conductive traces allow the metal percentage to be within a predetermined range in order to facilitate semiconductor fabrication processes such as CMP. In step 64, conductive traces may be divided into active and inactive segments with design law compliant spaces. The active segments in step 66 may be coupled to other circuit elements within other layers in order to form electrical circuits. Inactive segments may remain electrically isolated or be tied to a common ground. In step 68, verification checks are performed on the overall IC design wherein the physical characteristics of both active segments and inactive segments are considered.

This differs from prior metal fill solutions wherein metal fill and metal fill patterns were added to "white spaces" within the IC layers after the IC design had been verified. In such instances, the physical characteristics of the metal fill could adversely impact the operation of the IC. By incorporating metal fill in the design process, embodiments of the present invention help ensure improved process uniformity during semi-conductor fabrication and that the ICs perform as designed and expected.

Figure 7:
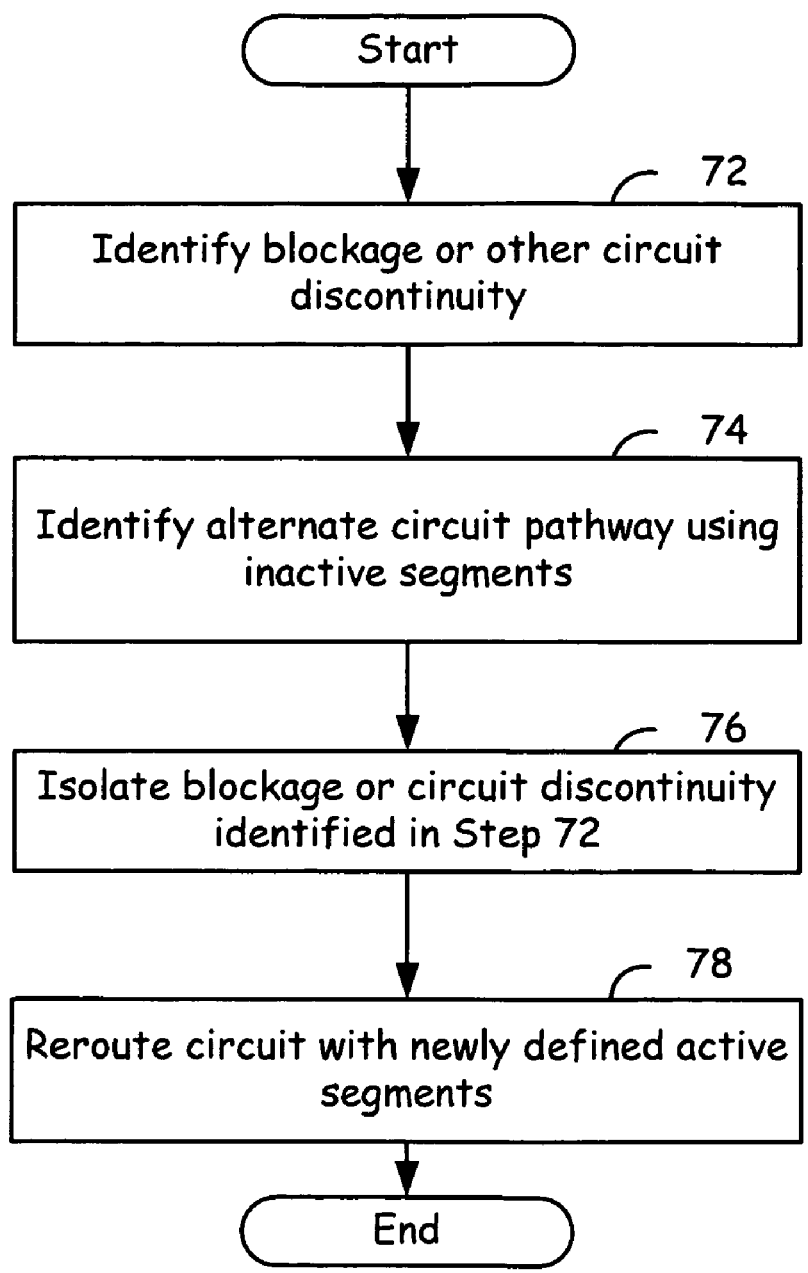
FIG. 7 provides a logic flow diagram illustrating how alternative circuit pathways may be implemented using inactive segments within metal layers in accordance with an embodiment of the present invention.

FIG. 7 provides a logic flow diagram illustrating an embodiment of the present invention wherein alternative circuit paths may be created from previously inactive segments of conductive traces. In this process, a potential problem associated with the circuit is identified in step 72. This potential problem may be a blockage or other circuit discontinuity that causes the circuit to operate improperly. In step 74, using the matrix of active and inactive segments such as that illustrated in FIG. 3, an alternative circuit pathway may be identified using inactive segments. In order to implement this alternative circuit pathway, the blockage or circuit discontinuity identified in step 72 should be isolated. This may be achieved by removing vias in insulating layers that couple the active segments that are causing the circuit problems or by inserting spaces in the previously identified active segment associated with the circuit problem. Then, newly activated segments may be separated from previously inactive segments with new design rule compliant spaces in these traces. These new activated segments may then be coupled to other components by modifying the masks associated with patterning by modifying the layers associates with the vias that would couple the newly active segments to other conductive layers and devices in the IC to form the desired circuit. In step 78, the circuit is rerouted to the newly defined active segments. Unlike prior solutions, the impact of these newly defined active segments are in processes such as CMP which may depend on metal content throughout the wafer during the fabrication processes should have minimal impact. Therefore, the likelihood of dishing or cupping associated with the newly defined active segments is minimized. Yet another embodiment provides a conductive layer within an IC or other similarly fabricated device such as a micro electro mechanical (MEMs) device wherein the conductive layer includes a number of conductive traces spaced according to the design rules associated with the device. These conductive traces are divided into active segments and inactive segments with design rule compliant spaces which electrically divide the conductive traces into segments. The presence of active segments and inactive segments allow the fabrication of the device while maintaining the metal content within a predetermined range both locally and globally. By maintaining this metal content, process variation associated with the fabrication of the device may be reduced. Such an individual layer was illustrated as layers 26 or 28 within FIG. 3, 4 or 4.

In summary, embodiments of the present invention provide a system and method with which to implement metal fill during design using tools such as a place and route tools or layout tools. Unlike prior known solutions where metal fill was performed after design and layout, performing metal fill during layout with a uniform pattern of conductive traces sized and spaced according to the design rules of the device to be fabricated resulting in more planning and design. Dividing the conductive traces into active and inactive segments during the design and layout identifies potentially negative impacts on critical or sensitive device elements within the device during design and layout. Previously, metal fill was implemented after design and layout and often resulted in negative impacts not previously accounted for during IC design. Embodiments of the present invention reduce degradation, seen in other devices where metal fill is incorporated after design and layout. Additionally, because the physical characteristics of inactive metal fill segments are considered during design and layout of the ICs.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention is described in detail, it should be understood that various changes, substitutions and alterations can be made hereto without departing from the spirit and scope of the invention as described by the appended claims.

What is claimed is:

1. An integrated circuit (IC), comprising:
   a plurality of conductive layers, wherein the conductive layers further comprise conductive traces regularly spaced according to a set of design rules;
   a plurality of design rule compliant cuts in the conductive traces operable to divide the conductive traces into active segments and inactive segments, the inactive segments initially operable to be electrically isolated from circuit devices in other layers and to reduce process variation during fabrication of the IC;
   a plurality of dielectric layers operable to vertically isolate conductive layers; and
   a plurality of vias in the dielectric layers wherein the vias are operable to initially
   electrically couple active segments to circuit devices in other layers in order to form electrical circuits;
   wherein electrical circuits having blockages within active segments are operable to be rerouted to inactive segments;
   wherein the active segments having blockages are electrically isolated from the electrical circuit; and vias in dielectric layers adjacent to the conductive layer electrically couple the previously inactive segments with circuit devices within other layers.

2. The IC of claim 1, wherein electrical effects of inactive segments and active segments are verified during IC design and layout.

3. The IC of claim 1, wherein the regularly spaced conductive traces reduce process variations during fabrication.

4. The IC of claim 1, wherein the regularly spaced conductive traces improve planarity within the IC during fabrication of the IC.

5. The IC of claim 1, wherein the active segments having blockages are electrically isolated with cuts compliant to the set of design rules.

6. A system operable to implement metal fill within an integrated circuit (IC), the system comprising:
   a layout tool operable to facilitate an integrated circuit (IC) design, wherein the layout tool:
      defines each conductive layer as a plurality of conductive traces regularly spaced according to a set of design rules; and
      forms active segments and inactive segments within the conductive traces with design rule compliant cuts, wherein:
         active segments of the conductive traces are initially operable to electrically couple to circuit devices within other layers to form electrical circuits within a IC; and
         inactive segments of the conductive traces are initially operable to be electrically isolated from circuit devices within other layers and to reduce process variation during fabrication of the IC; and
   a verification tool operable to verify the IC design, wherein the verification tool extracts physical characteristics associated with the IC to verify the IC design, wherein the physical characteristics include electrical characteristics of the active segments and electrical characteristics of the inactive segments; wherein:
      the verification tool is operable to identify problematic electrical circuits having blockages within active segments thereof; and
      the layout tool is operable to reroute problematic electrical circuits with inactive segments of the conductive traces.

7. The system of claim 6, wherein the problematic electrical circuits further comprise one or more of:
   crosstalk between IC components; and
   timing problems.

8. The system of claim 6, wherein the active segments and inactive segments improve planarity within the IC during fabrication of the IC.

9. A method operable to implement metal fill within an integrated circuit (IC), the method comprising:
   using a computer for:
      configuring a plurality of conductive traces within a conductive layer, wherein the traces are spaced according to a set of design rules;
      making cuts compliant to the set of design rules in the conductive traces, wherein the cuts are operable to divide the conductive traces into active segments and inactive segments;
      coupling active segments of the conductive traces initially with circuit devices within other layers to form electrical circuits; and
      electrically isolating the inactive segments of the conductive traces initially from circuit devices within other layers to reduce process variation during fabrication of the IC;

identifying problematic electrical circuits having blockages within active segments thereof;

identifying inactive segments operable to reroute the problematic electrical circuits; and rerouting the problematic electrical circuits by coupling electrically the identified inactive segments with circuit devices within other layers to form rerouted electrical circuits.

10. The method of claim 9, wherein vias in dielectric layers adjacent to the conductive layer, electrically couple the active segments with circuit devices within other layers.

11. The method of claim 9, wherein the problematic electrical circuits further comprise one or more of:

crosstalk between IC component; and timing problems.

12. The method of claim 11, wherein in rerouting electrical circuits further comprises:

electrically isolating the active segments having blockages;

wherein vias in dielectric layers adjacent to the conductive layer electrically couple the identified inactive segments with circuit devices within other layers to form the rerouted electrical circuits.

13. The method of claim 12, wherein electrically isolating the conductive traces having blockages further comprises removing vias from the dielectric layers adjacent to the conductive layer electrically that couple the active segments having blockages with circuit devices within other layers.

14. The method of claim 12, wherein electrically isolating the active segments having blockages further comprises making cuts compliant to the set of design rules in the active segments having blockages.

15. The method of claim 9, wherein the conductive traces reduce process variations during fabrication of the IC.

16. The method of claim 9, wherein the conductive traces improve planarity within the IC during fabrication of the IC.

17. A metal fill layer, comprising:

a plurality of conductive traces regularly spaced according to a set of design rules; and a plurality of design rule compliant cuts in the conductive traces operable to electrically separate segments of the conductive traces into active segments and inactive segments, wherein:

active segments of the conductive traces are operable to initially electrically couple to circuit devices within other layers to form electrical circuits within an integrated circuit (IC);

inactive segments of the conductive traces are initially operable to be electrically isolated from circuit devices within other layers and to reduce process variation during fabrication of the IC; and electrical circuits having blockages within active segments are operable to be rerouted to inactive segments using vias in dielectric layers adjacent to conductive layers to electrically couple the previously inactive segments with circuit devices within other layers.

* * * * *